Aug. 14, 1928.
W. H. SAUVAGE
1,681,057
REGULATOR FOR BRAKE RIGGING
Filed Nov. 1, 1927
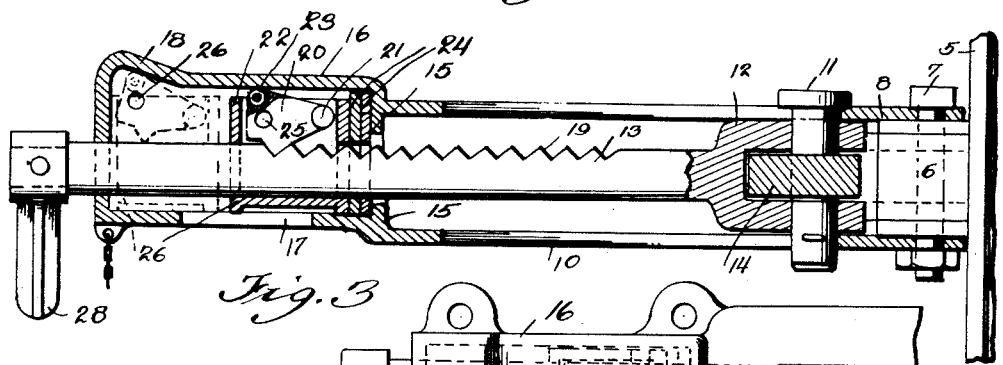
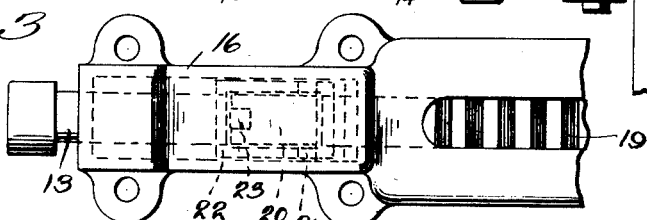
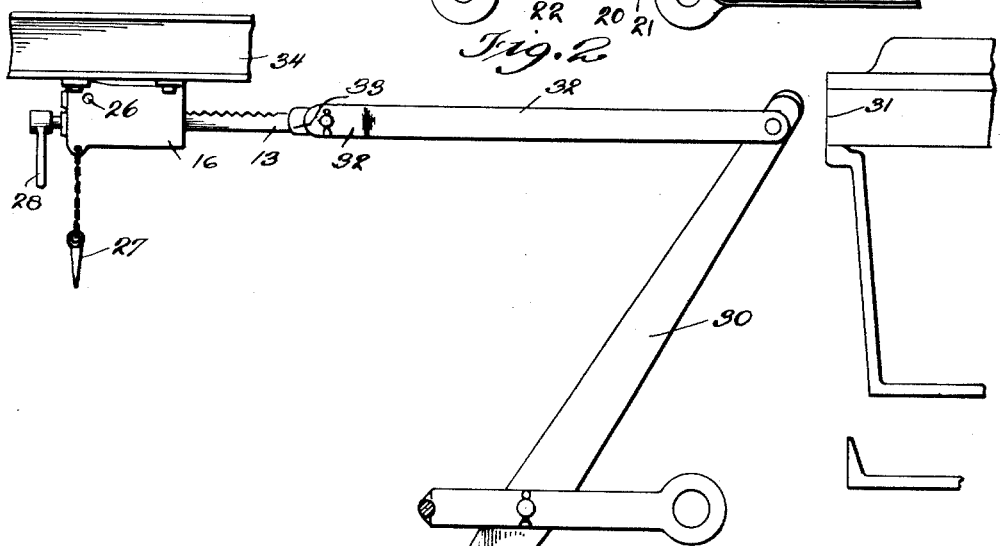
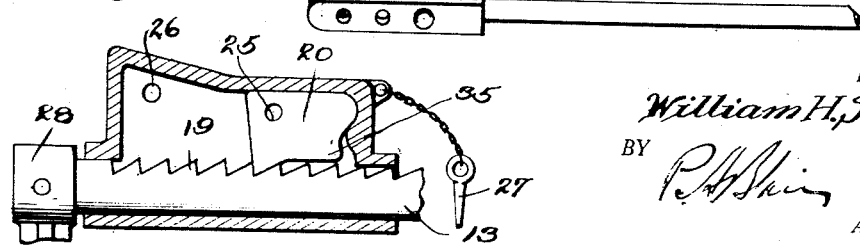
INVENTOR.
William H. Sauvage
BY
ATTORNEY.

Patented Aug. 14, 1928.

1,681,057

UNITED STATES PATENT OFFICE.

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE.

REGULATOR FOR BRAKE RIGGING.

Application filed November 1, 1927. Serial No. 230,349.

This invention relates to regulators for brake rigging and more particularly to manually actuated regulators for properly positioning a brake lever having a normally fixed fulcrum point, with respect to a predetermined position of brake actuation, thereby to insure uniform piston travel and proper predetermined brake shoe clearance.

One of the objects of the present invention is to provide a reliable and efficient mechanism of the above general character which will be of simple and practical construction and which may be easily and quickly applied to brake rigging now in general use without material modification of parts.

A further object is to provide a mechanism of the above general character which will be substantially fool-proof in operation and in which the working parts will be fully protected from atmospheric conditions and disturbances.

A further object is to provide a mechanism of the above general character which may be applied to any one of several points in the brake rigging for accomplishing substantially the same objects and purposes.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Fig. 1 is a longitudinal section showing such parts of the regulator and associated brake rigging as necessary to fully understand the invention;

Fig. 2 is a diagrammatic showing of a slightly modified form of the apparatus applied to a different part of the brake rigging;

Fig. 3 is a plan view of certain parts shown in Fig. 1: and

Fig. 4 is a modified form of the regulator shown in Fig. 1.

The invention will first be described with relation to its application to one of the cylinder levers, preferably the dead cylinder lever adjacent the rear end of the air brake cylinder. In Fig. 1, the cylinder head is indicated at 5 and is provided with a projecting post or lug 6 to which the regulator is secured in any desired manner as by means of one or more bolts 7 passing thru openings in one end of a casing or housing 8. This casing comprises an elongated rectangular chamber having slots 10 in its upper and lower surfaces, thereby to receive a pin 11 which passes thru the jaw 12 of a ratchet bar 13 and thru one end of a brake lever 14. The ratchet bar 13 as herein shown is square, but it will be understood that a bar or rod of circular cross section is equally adaptable. The casing 8 is provided near its central part with a partition 15 to form a second housing or chamber 16 in which is mounted the permanent take up and holding means hereinafter described. The chamber 16 is also of general rectangular shape and is provided with an opening 17 on its underside to permit ease of assembly as well as to allow any dust or dirt accumulating within the chamber 16 to drop out. The upper end portion of the chamber 16 is provided with an enlarged portion 18, and in said chamber is mounted a freely floating pawl 20 cooperating with ratchet teeth 19 on the bar 13. The pawl 20 is arranged within a cage 22 which is freely movable upon the bar 13 and is adapted upon operation of the regulator to travel the full length of the housing portion 13, designed to be proportional to full brake shoe clearance, to the position indicated by the dotted lines. The pawl 20 is provided with laterally extending projections or trunnions 21 engaging in the side walls of the cage 22, as indicated in dotted lines, Fig. 3.

A non-friction bearing wheel 23 is preferably provided at the upper portion to engage the adjacent inner top face of the housing 16, thereby to eliminate any possible chance of the pawl being retarded in its movement back and forth. It will also be noted that the pawl 20 is provided with a hole 25 which registers with a hole 26 when the pawl is in its raised position as shown by the dotted lines. These registering holes are for the purpose of receiving a tapered pin or key indicated at 27, Fig. 2, whereby the pawl may be held in its raised position when it is desired to move the ratchet rod 13 back to full release position as when applying new brake shoes. To permit of adjustment of the travel of cage 22 and pawl therein, one or more washers 24 may be arranged between the cage and partition 15 during assembly thru slot 17.

As is well known to those familiar with this general subject, it is highly essential in foundation brake rigging to have substantially uniform piston travel and a predetermined proper brake shoe clearance at all times in order to obtain maximum efficiency in operation. This predetermined brake shoe clearance is about one-fourth to three-eighths of an inch at each brake shoe, and the total brake shoe clearance of all shoes should be proportional to the movement of the cage 22 along the chamber 16.

In operation, when it is desired to regulate the brakes for obtaining a proper piston travel and brake shoe clearance, the operator or inspector grasps a handle 28 extending from ratchet bar 13 and forcibly pulls the same towards the left. This causes the pawl 20 which is held in fast engagement with ratchet rod 13 to move the full distance of brake shoe clearance to the dotted line position. As soon as the roller 23 reaches the raised portion 18 of the chamber 16, it may move upwardly as indicated, allowing one or more ratchet teeth to pass under the pawl in accordance with the excess brake shoe travel. When the handle 28 is released, the parts move back to their former position except for the new relative adjusted position existing between the pawl 20 and ratchet bar 13, thus insuring a predetermined brake shoe clearance by reason of the lost motion travel. In other words, the regulator takes up the excess travel in the entire brake rigging by a single operation, as above described, and at the same time causes proper piston travel, for, as the brake shoes have to move a certain distance to engage the wheels, obviously the piston will move only thru a proportional distance in order to take up this travel.

In Fig. 2, substantially the same mechanism is shown for attachment at one end of a car. In this instance, a dead lever 30 of the truck brake rigging, which normally takes a position of rest near the upper part of the truck bolster 31, is provided with a clevis link 32 connecting its upper end with a shackle 33 mounted upon one end of the ratchet bar 13. Housing 16, which may be bolted, riveted or otherwise permanently secured to the draft sill 34 near its outer end, is identical with the chamber 16 as shown in Fig. 1. The casing contains the pawl cage 22 and control parts as above indicated in the description relating to Fig. 1. This type of mechanism is particularly adapted for use with the foundation brake gear illustrated in my prior Patent, No. 1,612,781, dated December 28, 1926, and it is, of course, to be understood that similar cylinder brake lever supports or stops as therein described must be used in order to prevent the regulator movement at one end of the car from disturbing the angularity of the levers constituting the remaining part of the rigging.

The operation of the device shown in Fig. 2 is substantially the same as that above described, that is, upon actuating the handle 28, the associated truck brake shoe clearance is first absorbed by reason of the pawl cage 22 moving to the left hand side of the casing 16 whereupon any excess travel which may exist anywhere in the truck brake rigging is taken up by the pawl and ratchet mechanism. On release of the handle, the dead lever 30 drops back under gravity to its normal position of rest, thereby restoring the cage 22 to the position shown in full lines, Fig. 1, thus securing proper and predetermined brake shoe clearance throughout the entire brake system when the cooperating regulator at the other end of the car is also actuated. When it is desired to return the brakes to full release position, for replacing brake shoes the handle 28 is actuated to ride the pawl to its dotted line position, Fig. 1, and the key 27 is inserted thru holes 25, 26 in the pawl and housing 16 respectively. The pawl is thus held in raised position to permit the ratchet bar 13 to be returned to its full release position.

Referring to Fig. 4, therein is shown a modified form of the regulator, the pawl 20 is provided with a heel portion 35, which permits the pawl to ride freely on ratchet bar 13. In this form, the cage 22 and trunnions 21 are dispensed with, and the pawl 20 normally engages the inner top portion of housing 16. This feature, combined with the heel portion 35 riding on the ratchet teeth, causes the pawl to be maintained in substantially horizontal position, and in engagement with the ratchet 19, during its travel thru the housing 16. When the rod 13 is of square or rectangular cross section, holes 25 and 26 are provided in the pawl and housing 20 and 16 respectively to permit the key 27 to hold the pawl raised out of engagement with the ratchet, as hereinbefore indicated. I propose, in certain instances, to make the rod 13 of circular cross section, in which case, when the pawl 20 has traveled its full distance of brake shoe clearance, the rod 13 may be turned a quarter turn to disengage the pawl from the ratchet. Thereupon the rod 13 may drop back to its full release position.

From the above, it will be seen that the present type of regulator comprises a simple and practical mechanism having relatively few parts which are inexpensive to manufacture and assemble. The device is fool-proof in its operation in that the pawl cannot be moved from engagement with the ratchet except when the regulating movement is being accomplished. Likewise the parts are sure to return to normal position upon first actuation of the brakes, whereby proper brake shoe clearance is definitely assured.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim—

1. In combination with a lever of the foundation brake gear, a regulator therefor including a ratchet bar, a freely floating pawl cooperating with said ratchet bar, and means for holding said pawl in unyielding engagement with said ratchet bar except during the regulating operation.

2. In combination with a lever of the foundation brake gear, a regulator therefor including a ratchet bar, a freely floating pawl cooperating with said ratchet bar, and means for holding said pawl in engagement with said ratchet bar except during the regulating operation, said pawl having an anti-friction means on its upper part cooperating with a housing in which it freely floats.

3. In combination with a lever of the foundation brake gear, a regulator including a ratchet bar connected directly to said lever at one end, a pawl cooperating with said ratchet bar, and a housing thru which said bar extends and in which said pawl is freely floating, said housing having an enlarged portion into which said pawl moves during the regulating operation, thereby to permit release of the pawl from the ratchet.

4. In combination with a lever of the foundation brake gear, a regulator including a ratchet bar connected directly to said lever at one end, a pawl cooperating with said ratchet bar, a housing thru which said bar extends and in which said pawl is freely floating, said housing having an enlarged portion into which said pawl moves during the regulating operation thereby to release the pawl from the ratchet, and means for varying the travel of the pawl.

5. In combination with a lever of the foundation brake gear, a regulator adapted to have a relatively fixed position with respect to the car frame and comprising a housing, a ratchet bar passing thru said housing and connected at one end with said lever, a cage mounted upon said bar and within the housing, a pawl mounted in said cage and adapted to move on said ratchet bar during regulating movement, and means to limit the movement of said pawl in proportion to proper predetermined brake shoe clearance, said housing and pawl having openings adapted to be brought into registration for receiving means whereby the pawl may be held out of engagement with the ratchet bar when it is desired to return the ratchet bar to full release position.

6. In combination with a lever of the foundation brake gear, a regulator therefor including a ratchet bar having an operative connection with said lever, a housing thru which said ratchet bar extends, a pawl in said housing, means positively to hold said pawl in engagement with said ratchet bar thereby to travel with said ratchet bar an amount equal to total brake shoe clearance, and means permitting the ratchet bar to move relative to said pawl upon excess travel of the brakes during the regulating movement.

7. In combination with a lever of the foundation brake gear, a regulator therefor including a ratchet bar having an operative connection with said lever, a housing thru which said ratchet bar extends, a pawl in said housing, means to hold said pawl in engagement with said ratchet bar thereby to travel with said ratchet bar an amount equal to full brake shoe clearance, and means to hold the pawl released from said ratchet bar whereby the parts may return to full release position to permit replacement of brake shoes.

Signed at New York, New York, this 11th day of October, 1927.

WILLIAM H. SAUVAGE.